United States Patent
Laurent et al.

(10) Patent No.: US 8,733,809 B2
(45) Date of Patent: May 27, 2014

(54) HANDLING DEVICE FOR A WHEEL OF A VEHICLE AND HANDLING PROCESS FOR A WHEEL USING SUCH A DEVICE

(75) Inventors: Henri Laurent, Mably (FR); Guillaume Valette, Roanne (FR)

(73) Assignee: Nexter Systems, Roanne (FR)

( * ) Notice: Subject to any disclaimer, the term of this patent is extended or adjusted under 35 U.S.C. 154(b) by 252 days.

(21) Appl. No.: 13/026,846

(22) Filed: Feb. 14, 2011

(65) Prior Publication Data

US 2011/0206495 A1 Aug. 25, 2011

(30) Foreign Application Priority Data

Feb. 23, 2010 (FR) ...................................... 10 00736

(51) Int. Cl.
*B66F 9/00* (2006.01)
*B66C 1/12* (2006.01)

(52) U.S. Cl.
USPC ............... 294/74; 294/77; 152/214; 152/221; 414/815

(58) Field of Classification Search
USPC ....................... 294/74, 67.1, 67.21, 67.22, 77;
152/221, 219, 213 R, 214, 216, 213 A,
152/242; 156/111, 123; 206/304.1; 414/815
See application file for complete search history.

(56) References Cited

U.S. PATENT DOCUMENTS

| | | | | |
|---|---|---|---|---|
| 1,151,389 A * | 8/1915 | Preston | .......................... | 152/221 |
| 1,342,753 A * | 6/1920 | McGeorge | .................... | 152/219 |
| 2,332,113 A * | 10/1943 | Reed | .............................. | 152/241 |
| 3,842,881 A * | 10/1974 | Muller et al. | ............. | 152/213 A |
| 3,973,343 A | 8/1976 | Tolfsen | | |
| 4,185,674 A * | 1/1980 | Giannone | ...................... | 152/218 |
| 4,308,906 A * | 1/1982 | Bula et al. | ..................... | 152/219 |
| 5,167,737 A * | 12/1992 | Sakuma | ........................ | 152/219 |
| 5,221,380 A * | 6/1993 | Wilson et al. | ............. | 152/213 R |
| 6,026,876 A * | 2/2000 | Snyder | .......................... | 152/219 |
| 6,047,754 A * | 4/2000 | Drum | ........................ | 152/213 R |
| 7,070,059 B1 * | 7/2006 | Flowers et al. | ............... | 414/921 |
| 7,204,282 B2 * | 4/2007 | Scott et al. | .................... | 152/242 |
| 2002/0105199 A1 * | 8/2002 | Formanek et al. | ............. | 294/74 |
| 2009/0047108 A1 | 2/2009 | Barie et al. | | |
| 2012/0048897 A1 * | 3/2012 | Fowler et al. | .............. | 206/304.1 |

FOREIGN PATENT DOCUMENTS

| | | |
|---|---|---|
| CN | 2181491 Y | 11/1994 |
| DE | 4000915 A1 | 3/1991 |
| GB | 766477 | 1/1957 |
| WO | WO 96/12639 | 5/1996 |

OTHER PUBLICATIONS

French Search Report issued in French Patent Application No. 10/00736 on Sep. 17, 2010 (with translation).

* cited by examiner

*Primary Examiner* — Paul T Chin
(74) *Attorney, Agent, or Firm* — Oliff PLC

(57) ABSTRACT

A method and apparatus for handling a wheel of large mass from a storage position to enable its mounting onto the hub of a vehicle, wherein the method includes placing a tire in a handling device having two ends which are of substantially equal length, the length being longer than the perimeter of the wheel, between two ends of the handling device, bringing together the ends of the handling device so as to imprison the wheel within the handling device, and hooking the ends of the handling device into a handling and lifting device.

11 Claims, 8 Drawing Sheets

HANDLING DEVICE FOR A WHEEL OF A VEHICLE AND HANDLING PROCESS FOR A WHEEL USING SUCH A DEVICE

BACKGROUND OF THE INVENTION

1. Field of the Invention

The technical scope of the invention is that of handling devices or tooling for vehicle wheels, as well as processes to mount such wheels.

2. Description of the Related Art

On automobile vehicle assembly lines, or in repair workshops, mounting the wheels is performed when the vehicle is on a jack stand or conveyor.

The wheels are handled by being raised to the height at which they can be centered on the hub. Very often, the wheels are stored flat on their sides thereby adding to the raising operation an operation to pick up the wheel. However, depending on the categories of vehicle, the wheels may be very heavy making handling operations complicated, physical or even dangerous for the operators.

To assist assembly workers in these wheel handling operations, it is known by CN2181491 to use a device with metallic cables and jaws in which the wheel lies on a horizontal structure incorporating two jaws that pinch the tire at its low part on its two sides. Cables pass on either side of the wheel acting as a sling for the wheel assembly and holding the wheel vertically by passing over the top of the wheel.

This device has the drawback of being relatively complex with respect to the number and nature of its parts. Additionally, this device requires access to both sides of the wheel to enable the positioning of the jaws and the passage of the cables. It is thus necessary to employ several operators if the wheel is heavy to firstly lift the wheel manually if it has been stored flat and secondly to hold the wheel in a vertical position whilst the device is being installed.

SUMMARY OF INVENTION

The present invention relates to a handling device that is simple in structure and easy to install on a wheel, even when this is lying flat. The device enables the physical efforts and also the number of operators required to handle the wheel until it is mounted on the hub to be reduced.

The invention also relates to a wheel handling process implementing such a device.

Thus, the invention relates to a handling process for a wheel of large mass from a storage position, in particular to enable its mounting onto the hub of a vehicle, handling process wherein it comprises the following steps:
- a handling device that comprises at least two flexible non-elastic attachments parallel to one another and linked by at least two flexible and non-elastic fastening means is positioned on the wheel, the attachments and fastening means enable the tire tread mounted on a wheel to be encircled over substantially 360°, an attachment thus being position at each side flank of the wheel,
- the ends of the different flexible attachments are brought together so as to imprison the wheel within the handling device,
- the ends of the different flexible attachments of the handling device are hooked onto a handling and lifting device, such as a winch integral with a bridge crane, the latter ensuring the lifting and displacement of the wheel.

According to one characteristic of the process, for a wheel in a substantially vertical storage position, the wheel is positioned on the handling device by being rolled until it is centered on the length and the width of the handling device.

According to another characteristic of the process, the two attachments are integral with one another by their ends and thus form a single closed loop, and the ends of the different attachments are joined together by passing a first end of the loop and in a second end of the loop similarly to a slip knot. The first end of the loop may in this case be hooked to the lifting device.

The invention also relates to a handling device for the wheel of a vehicle equipped with a tire and implementing the process afore-mentioned, in particular to enable the wheel to be attached to the hub of a vehicle. The handling device incorporates at least two flexible non-elastic attachments arranged in parallel to one another and of a substantially equal length that is greater than that of the wheel's perimeter, the attachments being linked to one another by at least two flexible non-elastic fastening means, spaced along the attachments, the fastening means being, furthermore, of a length such that they leave a distance between the flexible attachments that is greater than the width of the tire and less than the width of the tire added to the side flank of the latter, thereby enabling an attachment to be positioned on each side flank of the tire.

According to one embodiment of the device, the two attachments are integral with one another by their ends and thus form a single closed loop.

In this case, advantageously, the flexible attachments are of a length such that it is possible to introduce one end of the loop into the other end after the device has been installed on a wheel.

According to one embodiment of the device, the flexible fastening means are also spaced around the periphery of the wheel and are six in number.

According to another embodiment, the device incorporates at least two fastening means at a distance from one another of around $2\pi R/3$ and at an equal distance from the ends of the device (R being the radius of the wheel).

According to a particular embodiment of the device, the flexible non-elastic attachments incorporate chains.

BRIEF DESCRIPTION OF THE DRAWINGS

The invention will become more apparent from the description of the different embodiments of the device as well as of the different steps in the process, such description being made with reference to the appended drawings, in which.

DETAILED DESCRIPTION OF PREFERRED EMBODIMENTS

The invention proposes to overcome the problem of handling heavy wheels having a mass of around 150 kg in a workshop, and requires only one operator to implement a process during which the wheel is enclosed in a specific device.

Figure 5:
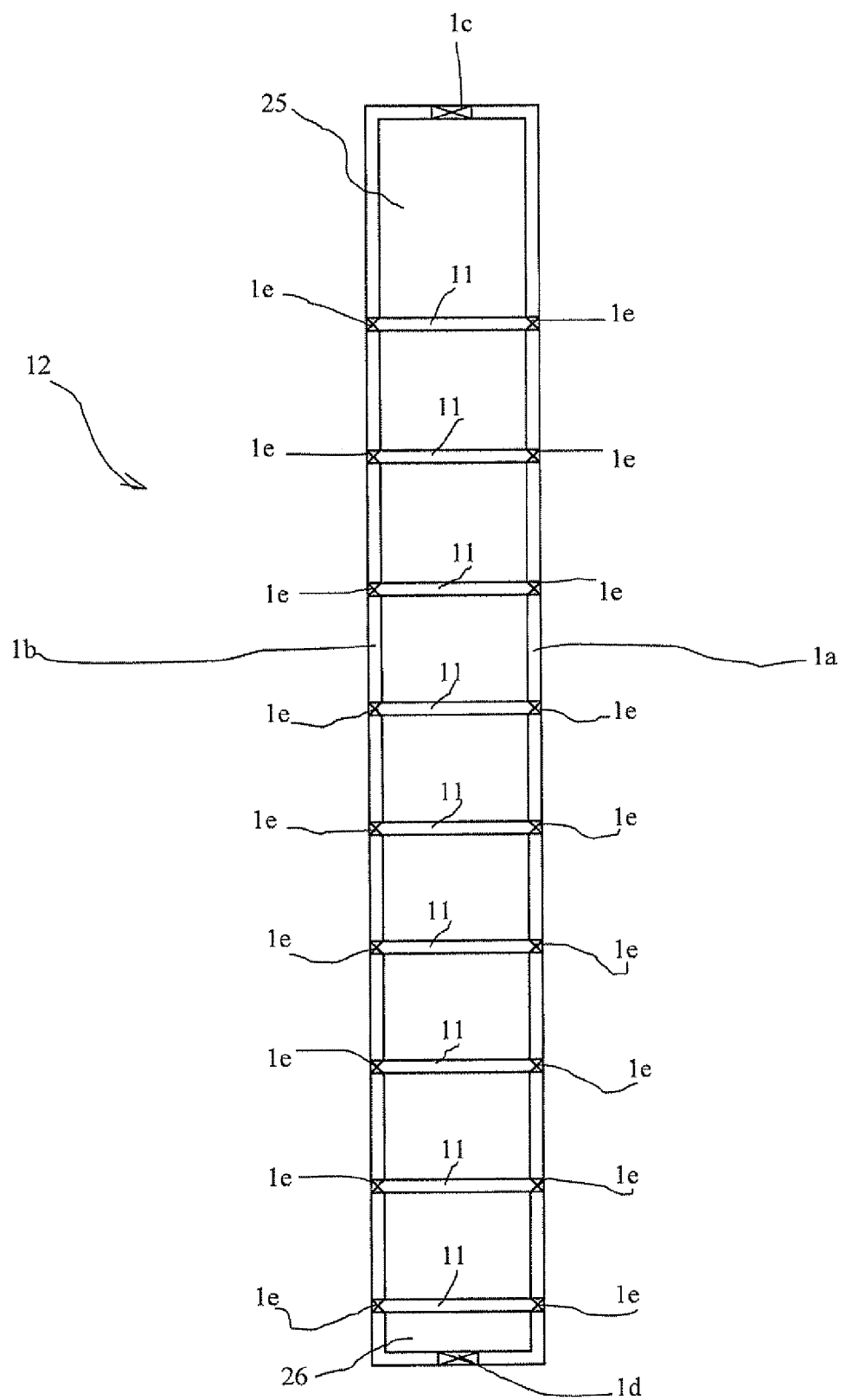
FIG. 5 shows a first embodiment of a handling device according to the invention.

According to FIG. 5 and according to one embodiment, the device 1 incorporates two first non-elastic textile attachments (straps) 1a and 1b parallel to one another. These two attachments 1a and 1b are joined together by their respective ends by means, for example, of seams 1c and 1d. The device incorporates second non-elastic textile attachments, also called fastening means 11, parallel to one another and joined by their ends to the first textile attachments 1a and 1b by means of seams 1e, for example.

Note that at each end of the device 1, the loops 25 and formed by the flexible attachments 1a and 1b and the adjacent fastening means 11 may be of sizes that are notably different. The fastening means 11 are spaced equally around the wheel. The greater the number of fastening means 11 the more efficient the retention of the wheel 2 and the easier the installation of the device. An optimal number of means is of around 5 to 9 means spaced around the periphery of the wheel.

Figure 1A:
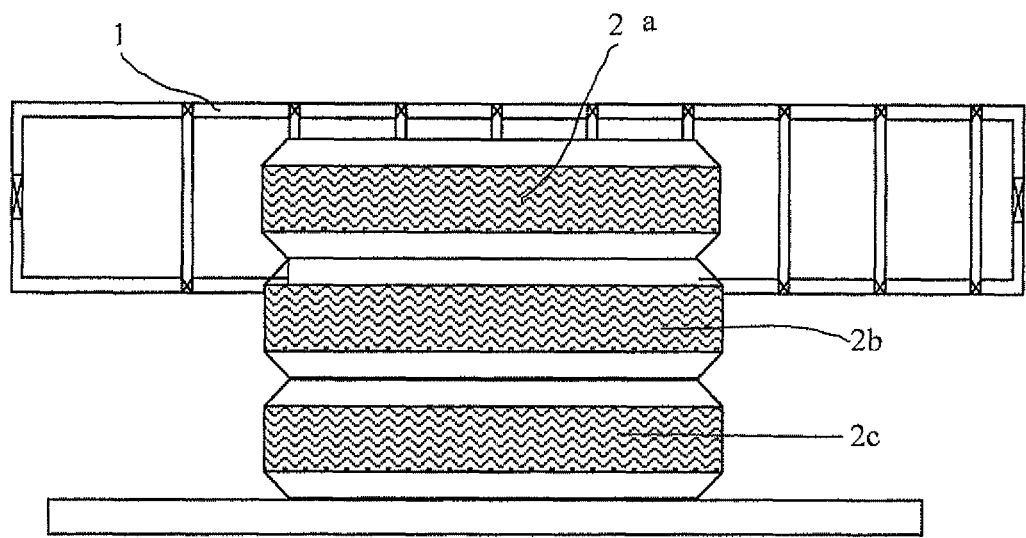
FIG. 1a shows one step to position the handling device around the wheel in the event of the wheel being laid on its side.
Figure 1B:
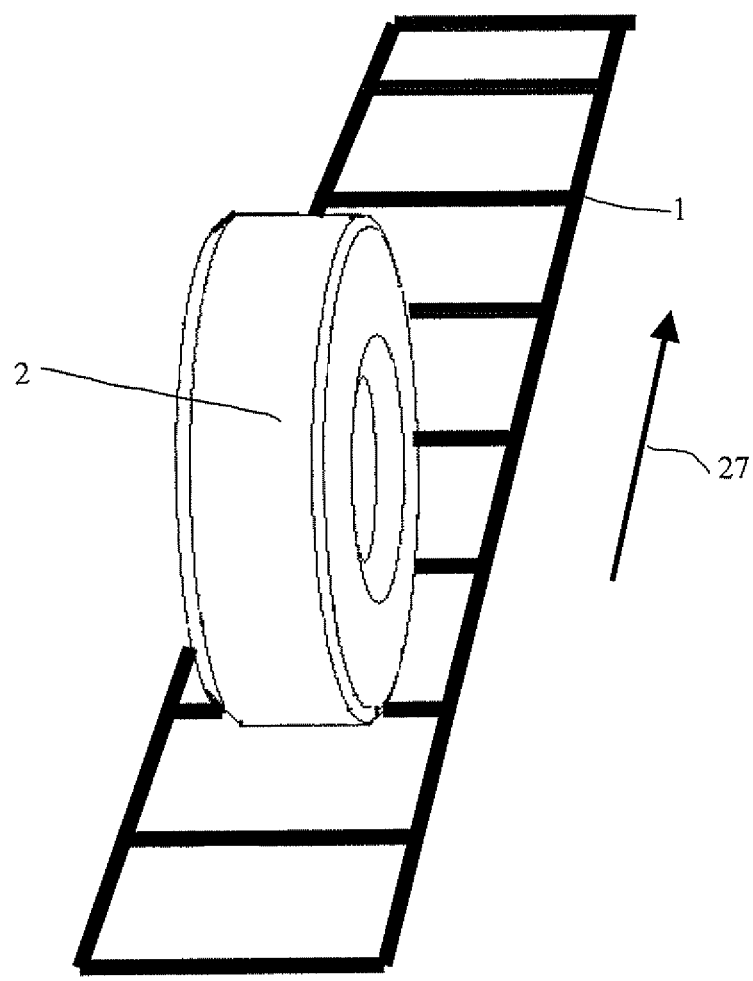
FIG. 1b shows the step to position the handling device around the wheel in the event of the wheel being positioned vertically.
Figure 3:
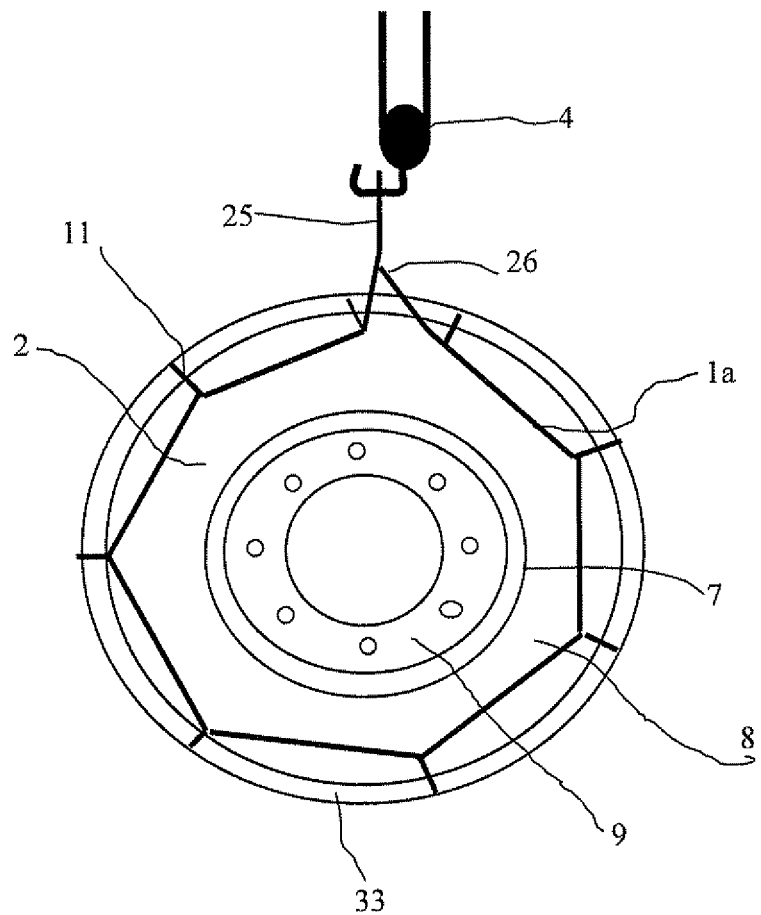
FIG. 3 shows a step in which the wheel is being raised using the handling device.

According to FIGS. 1a and 1b we note that the device 1 is wider than the wheel 2 so that the latter is properly held with respect to its flanks, such as shown in FIG. 3.

Figure 4:
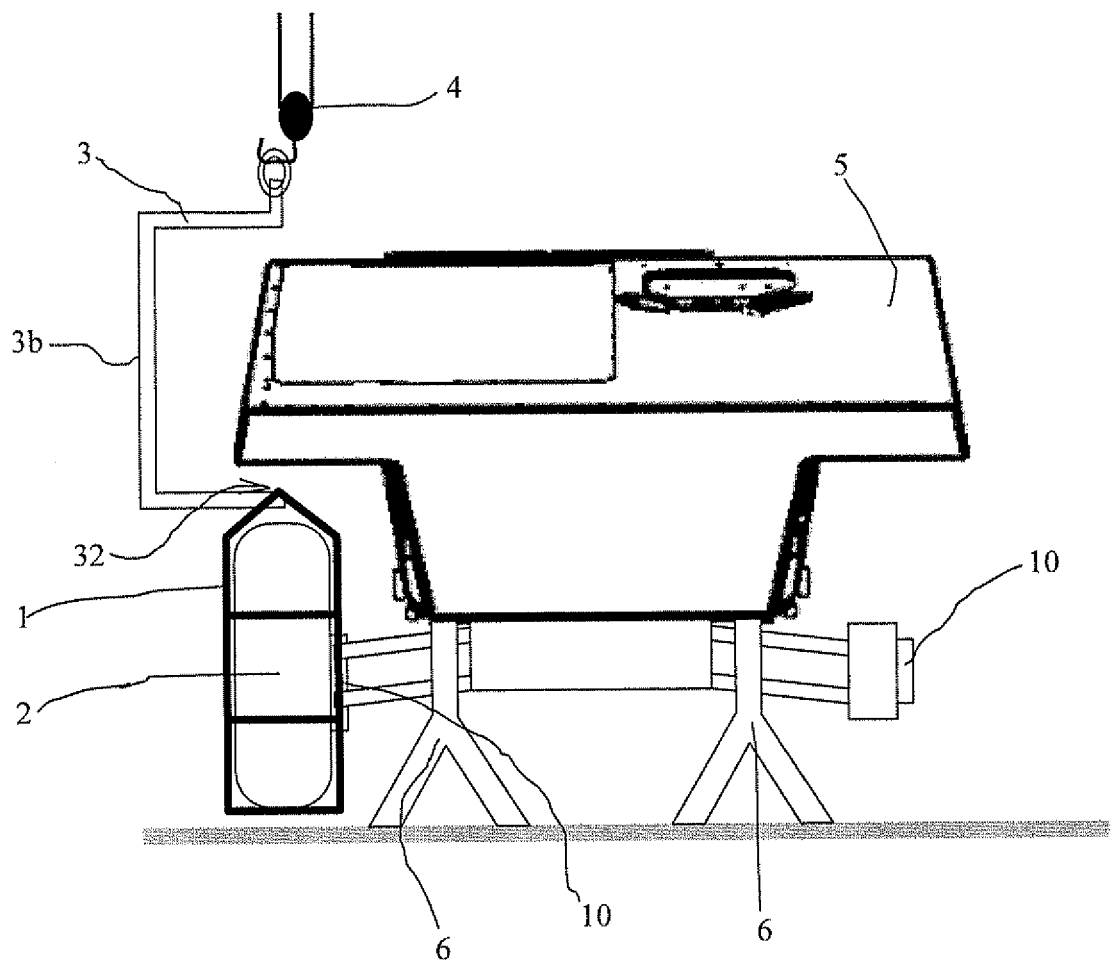
FIG. 4 shows a step in which the wheel equipped with the handling device is being positioned on the hub of a vehicle mounted on a jack stand.

According to FIG. 3, we will note that once the device has been wound around the wheel 2, the length of the fastening means 11 is such that each attachment 1a and 1b is located on one of the flanks 7 only of the wheel and does not lie across the wheel rim 9 which would hinder the mounting of the wheel 2 on a hub 10 (FIG. 4).

Each attachment 1a and 1b is thus applied to a different flank of the tire 8. Thus, the latter is held on either side by a different attachment 1a, 1b and there is no risk of the wheel coming out of the device 1, which would be the case if one of the attachments was on the tread of the tire. Also according to FIG. 3, we note that the spacing between the fastening means 11 is much less than the diameter of the wheel 2 and this to avoid the wheel passing through the links formed by the arrangement of attachments 1 and fastening means 11.

According to FIG. 1a and according to a first operating mode, a pile of wheels 2a, 2b and 2c laid horizontally is made available to the assembly worker, the handling device 1 is positioned so as to be tangential to the wheel 2a placed on the top of the pile of wheels. The device 1 extends in the same proportions beyond the width of the wheel 2a on both sides of said wheel. This first operating mode can be applied to a single wheel placed on the ground (configuration not shown).

Note that it is possible with the device according to the invention to position each attachment 1a, 1b substantially opposite one flank of the tire and thus to attach the device to the wheel without it being necessary to lift it. Indeed, the device 1 enables the flanks of the wheel 2 without said wheel having to be lifted.

According to FIG. 1b and according to a second operating mode, the wheel 2 is vertical and the handling device 1 is laid out on the ground. To bring the wheel 2 into the configuration shown in FIG. 1b, the operator must roll the wheel 2 onto the device 27 in the longitudinal direction of the device 1 until reaching the middle of the device.

Figure 2:
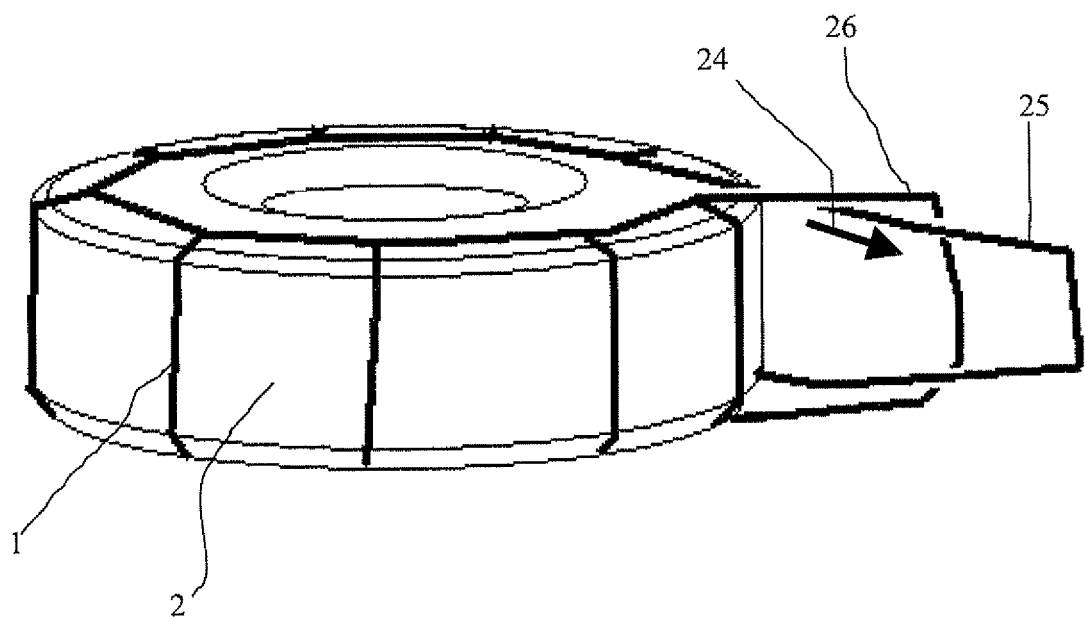
FIG. 2 shows a step in which the handling device is being closed around the wheel.

FIG. 2 shows how the device is joined to the wheel once it has been positioned on the latter. The device 1 is thus wound around the wheel 2. For this, the two ends 25 and 26 are brought together so as to circle the wheel 2.

According to one operating mode, in direction 24, a first end 25 forming a loop of the device 1 is passed through the loop formed by a second end 26 of the device 1. In the event that the loops are not of the same size, it is the largest one which is passed through the smallest one.

According to another operating mode not shown, the two ends 25 and 26 may simply be positioned edge-to-edge and held together by the installation of a lifting hook.

According to FIG. 3, the wheel is imprisoned over its full periphery by the device 1. A lifting hook 4 for a bridge crane (not shown) is hooked to the first end 25 of the device. According to the operating mode mentioned previously (not shown), the two ends 25 and 26 will be put edge to edge and will be hooked together on the hook 4. Once they have been hooked, the assembly formed by the wheel 2 in the device 1 is lifted and moved.

According to FIG. 4 and according to one operating mode, the wheel 2 is contained in the wheel 2 handling device. The device 1 is hooked to a C-lifting hook 3 which is attached to a hook on the bridge crane 4. The wheel is positioned on a hub 10 of a vehicle resting on a jack stand 6. A C-lifting hook is a well-known tool in a C shape and incorporates a lateral support 3b that is offset with respect to the line linking the attachment point 32 of the load and the attachment point of the hook 4 of the bridge crane. This tool is only used to enable access to zones of the vehicle 5 that are outset.

Hereafter, different devices are described that are made according to other embodiments and which may be used with the previously described process.

Figure 6:
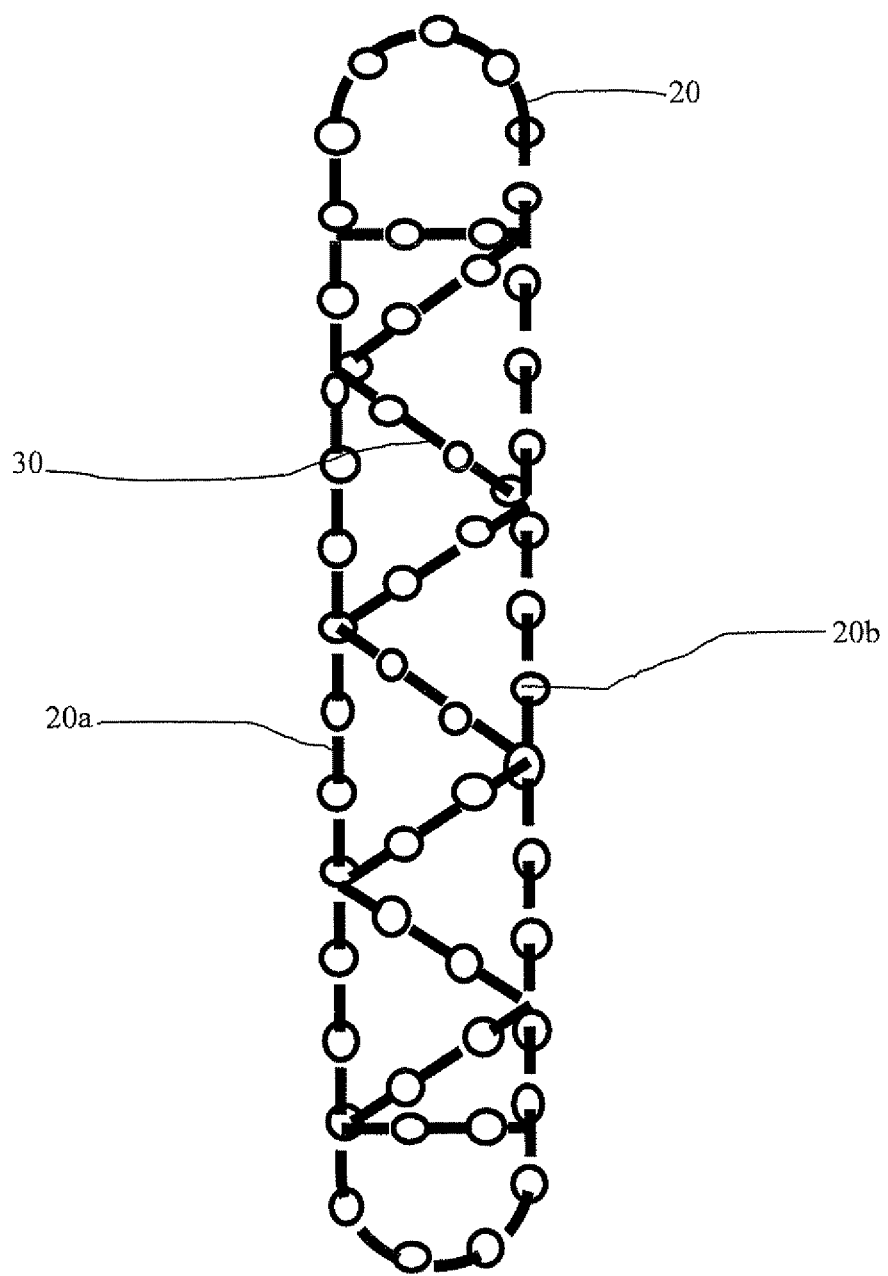
FIG. 6 shows a second embodiment of the handling device according to the invention.

According to FIG. 6 and according to a second embodiment, the device is formed of attachments formed by a first closed chain forming a single loop 20 arranged so as to make an oblong. The device 1 incorporates a second chain 30 that alternatively links the two longest sides 20a and 20b of the loop 20 so as to form segments constituting fastening means linking the two sides 20a and 20b of the loop 20.

The length of each segment (fastening means) of the second chain 30 is selected so that the longest sides 20a and 20b of the loop 20 are parallel to one another and spaced by a distance that is greater than the width of the wheel 2 and less than the width of the tire 33 to which is added the width of the side flanks 8.

The two chains 20 and 30 are made integral at each intersection of the loop 20 and of the second chain 30 by means of quick links or by the passage of the second chain 30 in the links of the loop 20. In this latter case, the links of the second 30 must be small enough to pass through the links of the loop 20.

Figure 7:
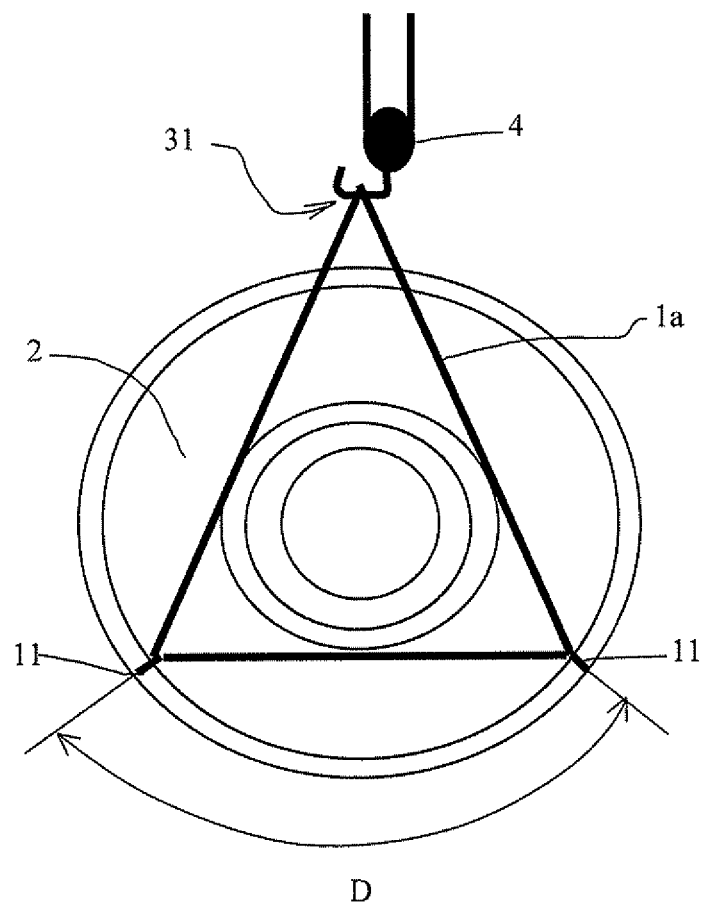
FIG. 7 shows a third embodiment of the handling device according to the invention.

FIG. 7 shows another embodiment in which the device 1 only incorporates two fastening means 11 separated by a distance D equivalent to approximately one third of the periphery ($2\pi R$) of the wheel 2 so that the wheel 2 (of radius R) does not pass between the fastening means 11 and is not able to roll out of the device 1.

Note also that the fastening means 11 are also placed at the same distance from the attachment point 31 of the device 1 with the hook 4 to ensure the hanging stability of the assembly. The flexible attachments 1a and 1b (1b not shown) ensure the lateral retention of the wheel 2.

What is claimed is:
1. A method for handling a wheel of large mass from a storage position, the method comprising:

positioning a first handling device on the wheel, the first handling device comprising at least two flexible non-elastic attachments parallel to one another and linked by at least two flexible non-elastic fastenings, said flexible non-elastic attachments and said flexible non-elastic fastenings enable the tire tread mounted on said wheel to be encircled over substantially 360° by the first handling device, said flexible non-elastic attachment thus being positioned at each side flank of said wheel, bringing the ends of said different flexible non-elastic attachments together so as to imprison said wheel within said first handling device, and hooking said ends of said different flexible non-elastic attachments of said first handling device onto a second handling and lifting device, wherein a length of the flexible non-elastic attachments of the first handling device is greater than that of a perimeter of the wheel.

2. The method according to claim 1, further comprising:
when the wheel is in a substantially vertical storage position, centering the wheel on the first handling device by rolling the wheel until it is positioned in the center of a length and a width of said first handling device.

3. The method according to claim 1, wherein said two flexible non-elastic attachments are integral with one another at their ends and thus form a single closed loop at each end, and the ends of said different flexible non-elastic attachments are joined together by passing a first end of said closed loop through a second end of said closed loop, the first end of said closed loop may then be hooked to said second handling and lifting device.

4. The method according to claim 1, wherein said two flexible non-elastic attachments of the first handling device are of an equal length, the length being greater than that of a perimeter of said wheel, and the flexible non-elastic attachments are linked to one another by said two flexible non-elastic fastening means, spaced along said flexible non-elastic attachments, wherein:

said at least two flexible non-elastic fastenings have a length such that they leave a distance between said flexible non-elastic attachments that is greater than a width of said tire and less than a width of said tire added to a side flank of said tire, thereby enabling one of said flexible non-elastic attachments to be positioned on each of said side flank of said tire.

5. The method according to claim 4, wherein the flexible non-elastic attachments are integral with one another at their ends and thus form a single closed loop.

6. The method according to claim 5, wherein said flexible non-elastic attachments are of a length such that it is possible to introduce one end of said loop into the other end after said first handling device has been installed on said wheel.

7. The method according to claim 4, wherein said flexible non-elastic fastenings are also spaced around the periphery of said wheel and are six in number.

8. The method according to claim 4, wherein said first handling device incorporates the at least two flexible non-elastic fastenings at a distance from one another of around $2\pi R/3$ and at an equal distance from the ends of said first handling device.

9. The method according to claim 4, wherein said flexible non-elastic attachments incorporate chains.

10. The method according to claim 1, wherein the second handling and lifting device is a winch integral with a bridge crane, the bridge crane ensuring the lifting and displacement of said wheel.

11. The method according to claim 1, further comprising:
mounting said wheel of large mass onto a hub of a vehicle.

* * * * *